(12) United States Patent
Lee et al.

(10) Patent No.: US 7,046,500 B2
(45) Date of Patent: May 16, 2006

(54) LAMINATED CERAMIC CAPACITOR

(75) Inventors: Byoung Hwa Lee, Sungnam (KR);
Dong Seok Park, Sungbook-ku (KR);
Min Cheol Park, Anyang (KR); Sang Soo Park, Suwon (KR); Chang Hoon Shim, Yongin (KR); Kyung Nam Hwang, Suwon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 11/068,757

(22) Filed: Mar. 2, 2005

(65) Prior Publication Data

US 2006/0018081 A1  Jan. 26, 2006

(30) Foreign Application Priority Data

Jul. 20, 2004   (KR) ............... 10-2004-0056255
Oct. 29, 2004  (KR) ............... 10-2004-0087200
Feb. 28, 2005  (KR) ............... 10-2005-0016872

(51) Int. Cl.
*H01G 4/005* (2006.01)
*H01G 4/228* (2006.01)

(52) U.S. Cl. ............... 361/303; 361/306.3; 361/309
(58) Field of Classification Search ........ 361/303–305, 361/301.4, 306.3, 311–313, 321.1, 321.2, 361/321.3, 321.4, 321.5
See application file for complete search history.

(56) References Cited

U.S. PATENT DOCUMENTS

| | | |
|---|---|---|
| 4,241,378 A | 12/1980 | Dorrian |
| 5,880,925 A | 3/1999 | DuPre et al. |
| 6,144,547 A | 11/2000 | Retseptor |
| 6,191,932 B1* | 2/2001 | Kuroda et al. ............... 361/303 |
| 6,441,459 B1* | 8/2002 | Togashi et al. ............. 257/532 |
| 6,850,404 B1* | 2/2005 | Engel et al. .............. 361/301.4 |
| 6,914,767 B1* | 7/2005 | Togashi et al. ............. 361/303 |
| 2004/0179325 A1 | 9/2004 | Togashi et al. |
| 2005/0047059 A1* | 3/2005 | Togashi .................... 361/306.3 |

FOREIGN PATENT DOCUMENTS

| | | |
|---|---|---|
| EP | 0 246 134 | 11/1987 |
| JP | 6-224071 | 8/1994 |
| JP | 2002151349 | 5/2002 |
| JP | 2002164256 | 6/2002 |

* cited by examiner

*Primary Examiner*—Eric W. Thomas
(74) *Attorney, Agent, or Firm*—Lowe Hauptman & Berner, LLP

(57) ABSTRACT

A laminated ceramic capacitor includes a ceramic block formed by laminating a plurality of ceramic sheets, a plurality of external electrodes formed on outer surfaces of the ceramic block facing each other, and set as a positive terminal and a negative terminal, respectively, one or more first and second internal electrodes alternately arranged within the ceramic block such that electric currents flow in opposite directions in the internal electrodes, and a plurality of withdrawing patterns for connecting the first and second internal electrodes to the external electrodes, respectively.

12 Claims, 14 Drawing Sheets

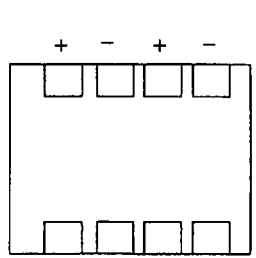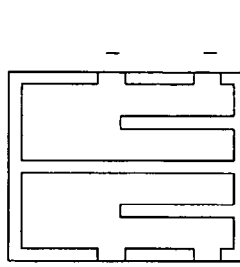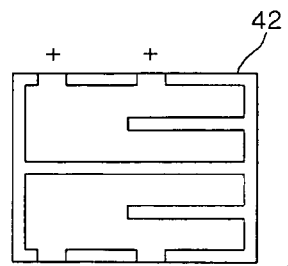
FIG. 11a
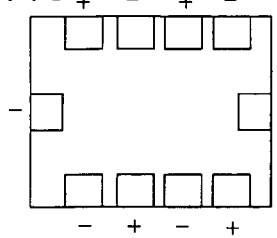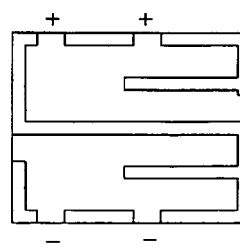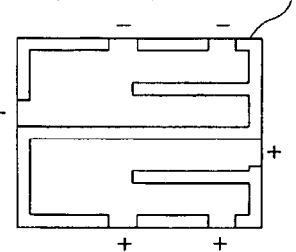
FIG. 11b
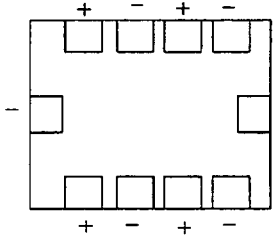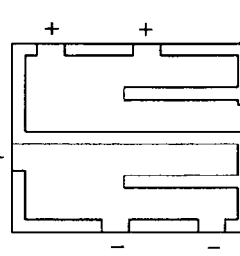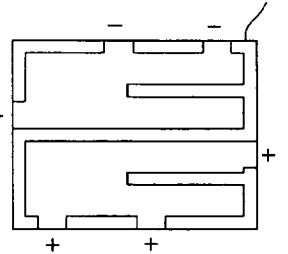
FIG. 11c
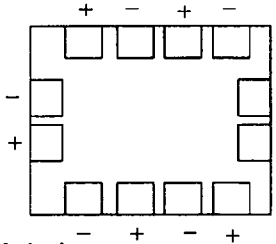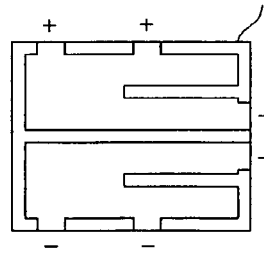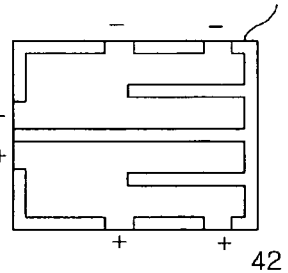
FIG. 11d
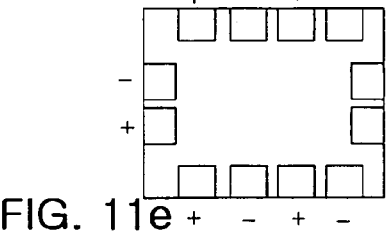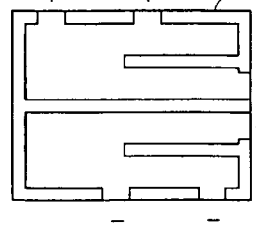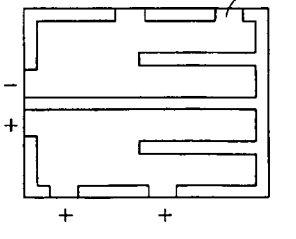
FIG. 11e

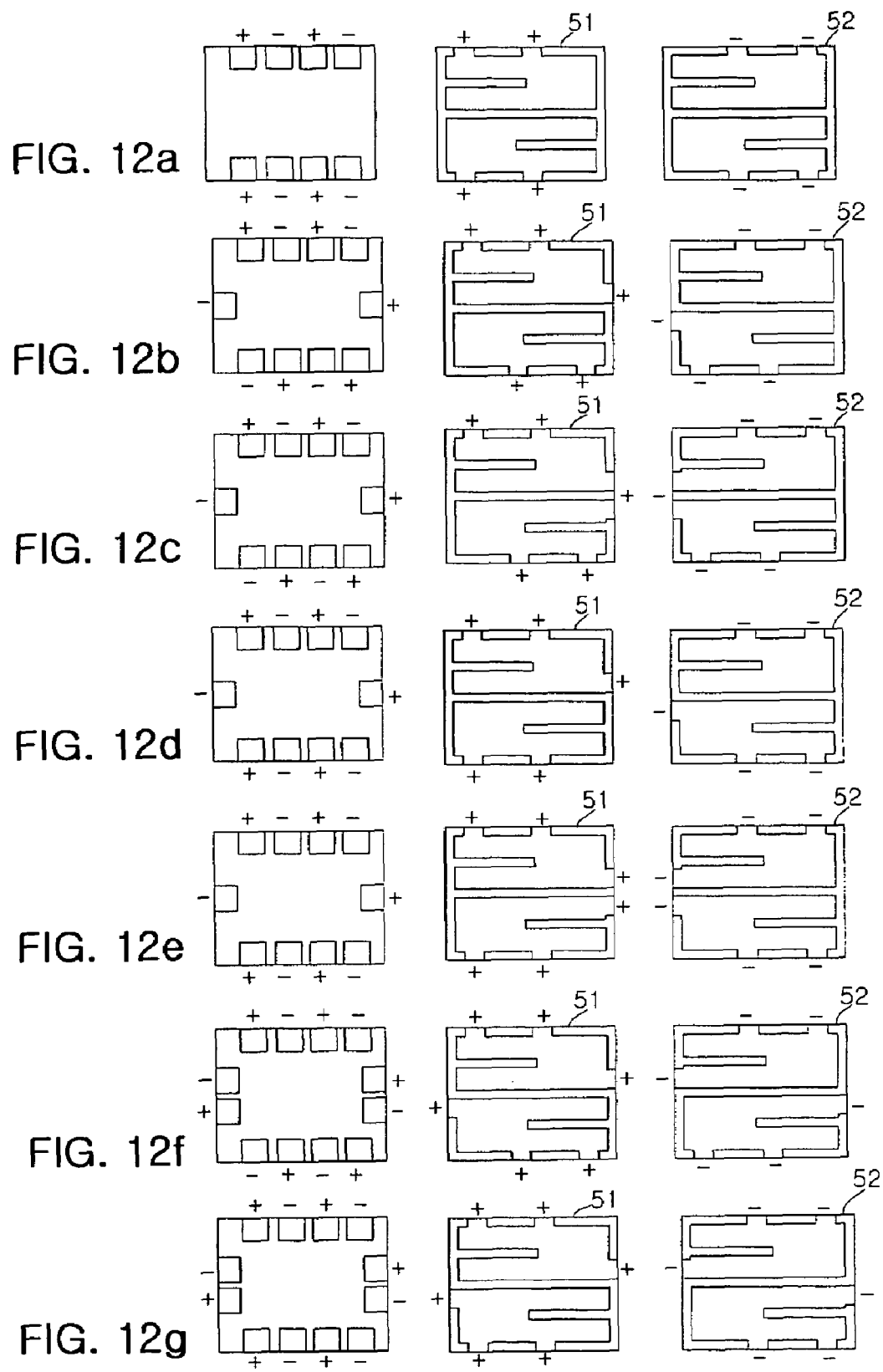

LAMINATED CERAMIC CAPACITOR

RELATED APPLICATIONS

The present invention is based on, and claims priority from, Korean Application Number 2004-56255, filed Jul. 20, 2004, Korean Application Number 2004-87200, filed Oct. 29, 2004, and Korean Application Number 2005-16872, filed Feb. 28, 2005, the disclosures of which are incorporated by reference herein in their entirety.

BACKGROUND OF THE INVENTION

1. Field of the Invention

The present invention relates to a laminated ceramic capacitor, and more particularly to a laminated ceramic capacitor, designed to realize a low equivalent series inductance (ESL) and a controllable equivalent series resistance (ESR) while realizing a high capacitance.

2. Description of the Related Art

A capacitor is a device for storing electricity, and is provided with two oppositely disposed electrode plates so that, when a voltage is applied to the capacitor, electric charges are accumulated in respective electrodes. When a direct voltage is applied to the capacitor, electric current flows in the capacitor during accumulation of the electric charges, whereas it does not flow in the capacitor after accumulation of the electric charges. When an alternating voltage is applied to the capacitor, the polarities of the electrodes are alternately varied, so that an alternating current continuously flows through the capacitor. Such a capacitor is generally indicated by an accumulative capacitance F.

Depending upon the dielectric material provided between the electrodes, capacitors can be classified into aluminum electrolysis capacitors which have aluminum electrodes and a thin oxide membrane between the aluminum electrodes, tantalum capacitors which are electrolysis capacitors having tantalum electrodes, ceramic capacitors which have a dielectric layer of a high dielectric constant, such as titanium-barium, provided between the electrodes, laminated ceramic capacitors which have multiple layers of ceramic material of a high dielectric constant as the dielectric material between the electrodes, and film capacitors which use polystyrene film as the dielectric material between the electrodes.

Among the above-mentioned capacitors, since the laminated ceramic capacitor has excellent temperature and frequency characteristics, and can be miniaturized, it has been applied to various electronic circuits.

FIG. 1 is a perspective view illustrating the outer appearance of a conventional laminated ceramic capacitor. Referring to FIG. 1, the conventional laminated ceramic capacitor 10 comprises a ceramic block 11, and external electrodes 12 and 13 formed on outer surfaces of the ceramic block 11 and set to positive and negative terminals, respectively.

The ceramic block 11 has two types of electrode patterns alternately arranged therein so as to be connected to positive and negative electrodes, respectively. Although the electrode patterns generally have a rectangular shape, the electrode patterns may have different shapes and arrangements in order to enhance characteristics of the capacitor.

FIG. 2 is an exploded perspective view illustrating the arrangement of internal electrodes of the conventional laminated ceramic capacitor. Referring to FIG. 2, the laminated ceramic capacitor has two types of rectangular internal electrode patterns 21 and 22 connected to different electrode terminals while being alternately laminated in the ceramic block. At this time, the internal electrode patterns 21 and 22 are provided with withdrawing patterns 21a and 22a connected to the external electrodes 12 and 13 formed on the outer surface of the ceramic block 11 such that voltages having opposite polarities can be applied to the internal electrode patterns 21 and 22, respectively.

In the laminated ceramic capacitor constructed as described above, when the voltages having the opposite polarities are applied to the internal electrode patterns 21 and 22 vertically adjacent to each other, electric charges are accumulated between the internal electrode patterns 21 and 22 having the opposite polarities, respectively. With such a construction, areas of the electrode patterns facing each other within the ceramic block are increased, so that the capacitor can have a high capacitance.

For such a laminated ceramic capacitor, a lower equivalent series inductance (ESL) is preferred. However, the equivalent series resistance (ESR) must be maintained above a certain level, and in some cases, it need to raise the ESR by user's request.

Meanwhile, in the case of the laminated ceramic capacitor as shown in FIG. 2, the positive and negative electrodes are alternately arranged, so that magnetic fluxes generated by high frequency currents flowing in the electrode patterns 21 and 22 facing each other are counterbalanced, thereby reducing ESL. However, not only is such reduction of the ESL insufficient to satisfy the requirements, but the ESR is also significantly lowered since resistances generated by the withdrawing patterns 21a and 22a formed to the internal electrode patterns 21 and 22, respectively, are connected in parallel.

The ESL is an unwanted component, which deteriorates the characteristics of the capacitors, and is increased in proportion to a path of electric currents flowing through the electrode patterns. Particularly, the ESL can be further increased if the electric currents flow in an identical direction through the electrode patterns 21 and 22 facing each other.

In order to reduce the ESL, the electric currents are changed to flow in different directions through adjacent internal electrode patterns 21 and 22, so that the magnetic fluxes generated by the electric currents are counterbalanced, thereby reducing the ESL. Alternatively, the path of the electric current is decreased, thereby reducing the ESL.

Referring to FIG. 2, the laminated ceramic capacitor are further provided with additional withdrawing patterns and formed in opposite directions, respectively, whereby the electric currents flowing in the internal electrode patterns 21 and 22 are guided to flow in opposite directions, thereby further reducing the ESL in comparison to the construction shown in FIG. 2.

However, with the constructions described above, the ESL cannot be completely prevented from being generated in the capacitor. In particular, in the case of decoupling capacitors applied to high frequency circuits, since a small ESL can influence the decoupling capacitors, it is necessary to further reduce the ESL, and the problem of generating a too low ESR is still present.

A laminated electronic component disclosed in Japanese Patent Laid-open Publication No. 2002-151349 has internal electrodes provided on a plurality of internal planes within a ceramic block while being formed as two ruler-shaped electrode patterns thereon. According to the disclosure, the two ruler-shaped electrode patterns are arranged in the same plane, such that electric currents can flow in opposite directions through the electrode patterns, thereby reducing ESL caused by high frequency current. A laminated electronic component disclosed in Japanese Patent Laid-open Publication No. 2002-164256 has internal electrodes provided on a plurality of internal planes within a ceramic block, in which each of the internal electrodes has a notch, and at least one pair of current paths are formed at both sides of the notch to allow the electric currents to flow in opposite directions through the current paths. According to this document, the electric currents flow in opposite directions through the two current paths within one internal electrode, thereby reducing ESL caused by high frequency current.

According to the above disclosures, although the ESL can be further reduced in comparison to the laminated devices shown in FIGS. 2 and 3, the reduced amount of the parasitic impedance does not satisfy the level required for the decoupling capacitors for high frequency circuits. Moreover, in the case of the high frequency circuit, since the ESL of the decoupling capacitors has a high influence on circuit capacitance, it is necessary to further reduce the ESL.

FIG. 3 is a laminated electronic capacitor disclosed in U.S. Pat. No. 6,441,459. Referring to FIG. 3, the laminated ceramic capacitor has internal electrodes 31–38, each having one withdrawing pattern 31a–38a, thereby satisfying the ESR. However, according to the disclosure, there is a problem in that the ESL is increased.

SUMMARY OF THE INVENTION

The present invention has been made to solve the above problems, and it is an object of the present invention to provide a laminated ceramic capacitor, which can simultaneously satisfy requirements for ESL and ESR while having a high capacitance without increasing the size and the number of processes of the capacitor.

In accordance with one aspect of the present invention, the above and other objects can be accomplished by the provision of a laminated ceramic capacitor, comprising: a ceramic block formed by laminating a plurality of ceramic sheets; a plurality of external electrodes formed on outer surfaces of the ceramic block facing each other, and set as a positive terminal and a negative terminal, respectively; one or more first and second internal electrodes alternately arranged within the ceramic block such that electric currents flow in different directions in the internal electrodes; and a plurality of withdrawing patterns for connecting the first and second internal electrodes to the external electrodes, respectively.

The electric currents may flow in the first and second internal electrodes in opposite directions.

The electric currents may flow in the first and second internal electrodes in directions perpendicular to each other.

Each of the first and second internal electrodes may comprise a pair of rectangular conductive patterns adjacent to each other, and at least one slot formed from a lateral side toward the center of each conductive pattern to change a direction of the electric current within the conductive pattern.

Each of the first and second internal electrodes may comprise a rectangular conductive pattern, and at least one slot formed from a lateral side toward the center of the conductive pattern.

Each of the first internal electrodes may comprise a rectangular conductive pattern, and two slots extended from two lateral sides of the rectangular conductive pattern facing each other toward the center of the conductive pattern, and each of the second internal electrodes may comprise a rectangular conductive pattern, and two slots perpendicular to the slots of the first internal electrode while being extended from two lateral sides of the rectangular conductive pattern facing each other toward the center of the conductive pattern.

Each of the first internal electrodes may comprise a rectangular conductive pattern, and a slot extended between two lateral sides of the rectangular conductive pattern facing each other so as to bisect the rectangular conductive pattern, and each of the second internal electrodes may comprise a rectangular conductive pattern, and two slots perpendicular to the slot of the first internal electrode while being extended from two lateral sides of the rectangular conductive pattern facing each other toward the center of the conductive pattern.

Each of the first internal electrodes may comprise a rectangular conductive pattern, and each of the second internal electrodes may comprise a rectangular conductive pattern, and a slot extended between two lateral sides of the rectangular conductive pattern facing each other so as to bisect the rectangular conductive pattern.

The slots may be located at the same positions or at opposite positions in the pair of conductive patterns.

The pair of conductive patterns may allow the electrical currents to flow in opposite directions through adjacent regions of the conductive patterns.

Each of withdrawing patterns may be formed in each of the conductive patterns in each internal electrode such that the withdrawing patterns are located at different positions in the conductive patterns perpendicularly adjacent to each other, respectively.

In the case of being disposed in the same direction, the pair of conductive patterns may be connected to the external electrodes having the different polarities, and in the case of being disposed in opposite directions, the pair of conductive patterns may be connected to the external electrodes having the same polarity.

When the plurality of external electrodes comprises first to fourth external electrodes spaced a predetermined distance from each other on one side surface of the ceramic block in a predetermined direction, and fifth to eighth external electrodes formed on the opposite side surface of the ceramic block in the same direction as that of the first to fourth external electrodes, the withdrawing patterns respectively formed to the conductive patterns at one side may be connected to the first to fourth external electrodes from above to below according to the lamination order, while the other withdrawing patterns respectively formed to the other conductive patterns at the other side may be connected to the fifth to eighth external electrodes from above to below according to the lamination order.

BRIEF DESCRIPTION OF THE DRAWINGS

The above and other objects, features and other advantages of the present invention will be more clearly understood from the following detailed description taken in conjunction with the accompanying drawing:

FIGS. 11a to 11e are diagrams illustrating withdrawing patterns according to arrangements of the external electrodes in the laminated ceramic capacitor according to the first embodiment of the present invention;

FIGS. 12a to 12g are diagrams illustrating withdrawing patterns according to arrangements of the external electrodes in the laminated ceramic capacitor according to the second embodiment of the present invention;

DESCRIPTION OF THE PREFERRED EMBODIMENTS

Preferred embodiments of the present invention will now be described in detail with reference to the accompanying drawings.

Figure 1:
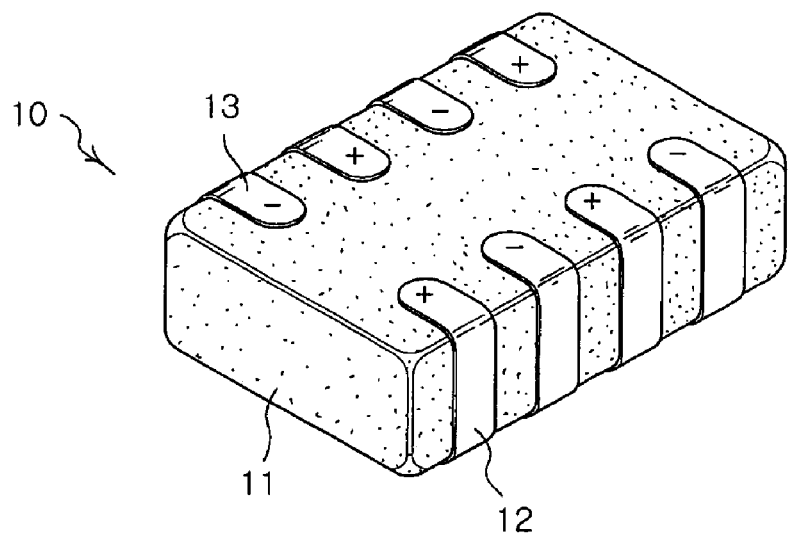
FIG. 1 is a perspective view of an outer appearance of a laminated ceramic capacitor.
Figure 2:
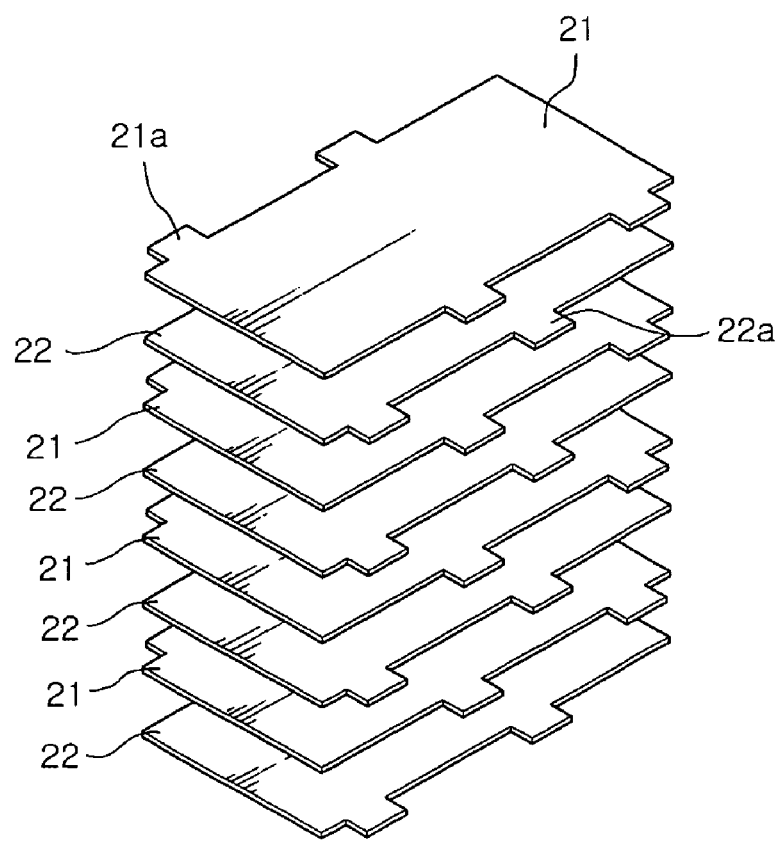
FIG. 2 is an exploded perspective view illustrating the arrangement of internal electrodes of the conventional laminated ceramic capacitor.
Figure 3:
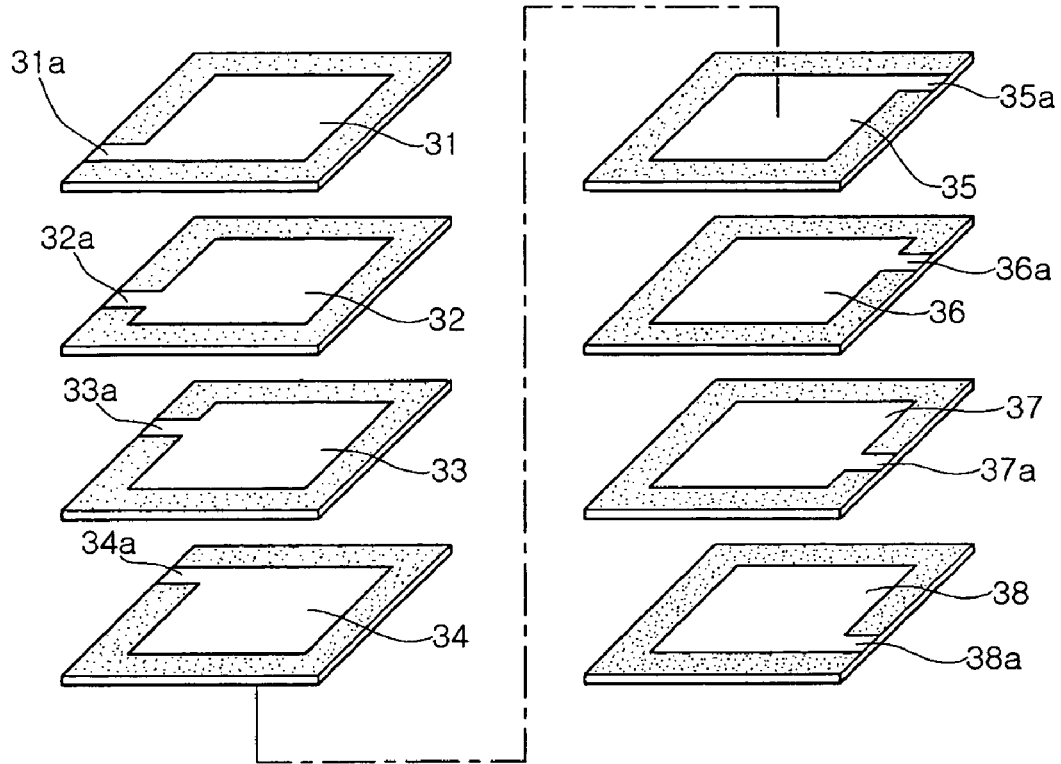
FIG. 3 is a diagram illustrating internal electrodes of another conventional laminated ceramic capacitor.

Similar to the conventional laminated ceramic capacitor shown in FIG. 1, a laminated ceramic capacitor according to the invention generally comprises a ceramic block 11 consisting of four side surfaces and upper and lower surfaces, and a plurality of external electrodes 12 and 13 provided to the side surfaces of the ceramic block 11 and set to a positive terminal and a negative terminal, respectively.

Referring to FIG. 1, an eight-terminal type capacitor is illustrated, which comprises the ceramic block 11, and eight external electrodes 12 and 13 provided to opposite side surfaces of the ceramic block 11, each of which is provided with four external electrodes 12 and 13. However, without being limited to this construction, the shape and the number of the external electrodes 12 and 13 can be increased according to requirements. For instance, in addition to the opposite side surfaces of the ceramic block 11 having four external electrodes 12 and 13, respectively, other opposite side surfaces of the ceramic block 11 may be provided with two external electrodes, respectively, that is, two external electrodes may be additionally provided to the capacitor, thereby realizing a ten-terminal type capacitor. Alternatively, in addition to the eight external electrodes 12 and 13, two external electrodes may be additionally provided to other opposite side surfaces of the ceramic block 11, respectively, thereby realizing a twelve-terminal type capacitor.

The external electrodes 12 and 13 of the ceramic block 11 are set to the positive polarity and the negative polarity, respectively.

As with the conventional laminated ceramic capacitor, first and second electrodes having different polarities are alternately laminated within the ceramic block 11 in the vertical direction, and perform an accumulating function of a predetermined capacitance.

The laminated ceramic capacitor of the invention has characteristics in that the first and second internal electrodes alternatively laminated within the ceramic block 11 are shaped to allow electric currents to flow through the first and second internal electrodes in opposite directions, thereby decreasing the ESL.

FIGS. 4a to 10 show various arrangements of first and second internal electrodes of laminated ceramic capacitors according to various embodiments of the invention.

Figure 4A:
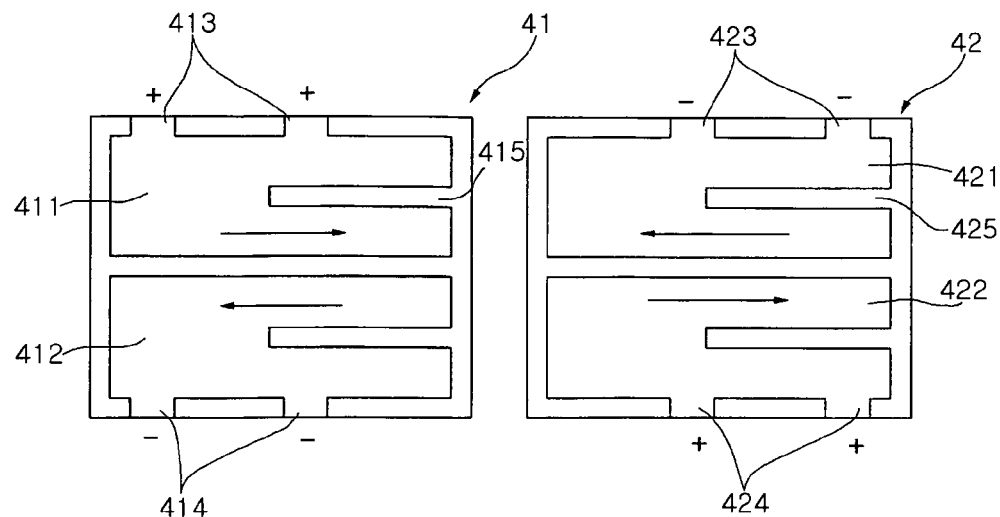
FIGS. 4a and 4b are diagrams illustrating internal electrodes of a laminated ceramic capacitor according to a first embodiment of the present invention.
Figure 4B:
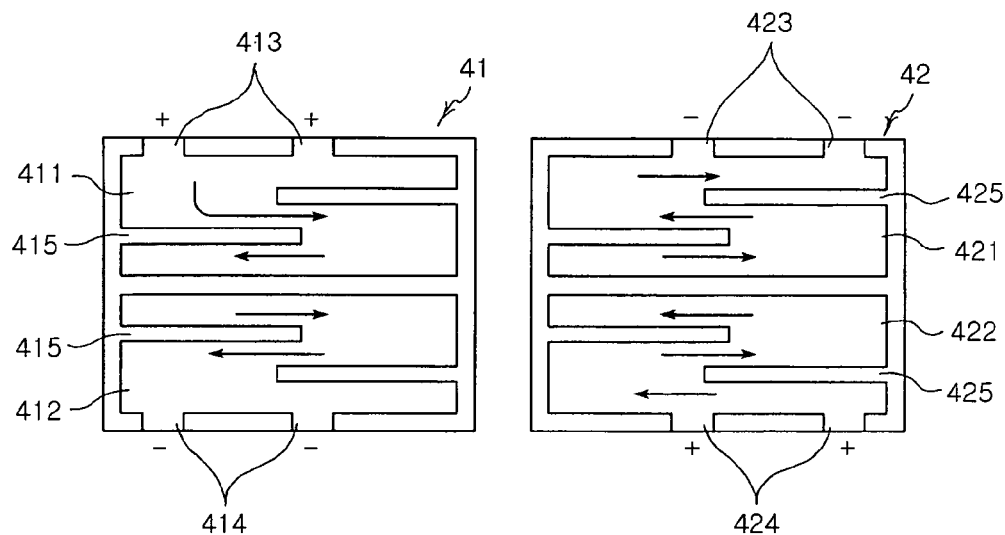

First, FIGS. 4a and 4b are diagrams illustrating internal electrodes of a laminated ceramic capacitor according to a first embodiment of the invention. Referring to FIGS. 4a and 4b, the laminated ceramic capacitor of the invention has first and second internal electrodes 41 and 42 vertically disposed adjacent to each other within the ceramic block 11, while allowing voltages having different polarities (such as a positive polarity and a negative polarity) to be applied thereto, respectively, and a plurality of withdrawing patterns 413 and 414; 423 and 424, which connect the first and second internal electrodes 41 and 42 to the external electrodes 12 and 13, respectively. As the first and second internal electrodes 41 and 42 are vertically adjacent to each other, and the voltages having different polarities are applied thereto, magnetic fluxes generated by high frequency current of the respective internal electrodes can be counterbalanced.

Additionally, each of the first and second internal electrodes 41 and 42 consists of a pair of first and second conductive patterns 411 and 412; 421 and 422. The first and second conductive patterns 411 and 412; 421 and 422 are disposed in parallel on predetermined planes within the ceramic block 11, respectively, and each of the conductive patterns has a slot for controlling current path. At this time, the plurality of withdrawing patterns 413 and 414; 423 and 424 are integrally formed to the first and second conductive patterns 411 and 412; 421 and 422 while being connected at their ends to the external electrodes 12 and 13 having the positive polarity and the negative polarity, respectively.

At this time, the first conductive patterns 411 and 421, and the second conductive patterns 412 and 422 are connected to the external electrodes having the different polarities, respectively, so that the electric currents flow in opposite directions through adjacent regions of the first conductive patterns 411 and 421 and the second conductive patterns 421 and 422, whereby the magnetic fluxes generated by the first conductive patterns 411 and 421 and the second conductive patterns 421 and 422 disposed on the same planes are counterbalanced. Additionally, the external electrodes 12 and 13 having different polarities are connected to the first and second internal electrodes 41 and 42 vertically adjacent to each other, whereby the magnetic fluxes are counterbalanced between the first and second internal electrodes 41 and 42.

For instance, in the first internal electrode 41, the first conductive pattern 411 is connected to the positive external electrodes 12 through the withdrawing patterns 413, while the second conductive pattern 412 is connected to the negative external electrodes 13 through the withdrawing patterns 414. In the second internal electrode 42, the first conductive pattern 421 is connected to the negative external electrodes 13 through the withdrawing patterns 423, while the second conductive pattern 422 is connected to the positive external electrodes 12 through the withdrawing patterns 424.

In the laminated ceramic capacitor of the invention, electric currents flow in opposite directions through the adjacent first and second internal electrodes 41 and 42 disposed on different planes from each other within the ceramic block 11, while flowing in opposite directions through the pair of conductive patterns 411 and 412; 421 and 422 disposed on the same planes, respectively, and additionally, each of the conductive patterns 411 and 412; 421 and 422 is partially divided by means of the slot such that the electric currents flow in opposite directions through adjacent current paths within that pattern, whereby magnetic fluxes caused by the electric currents flowing in the capacitor are counterbalanced, thereby minimizing ESL.

In general, in the case where the electric currents flow in opposite directions through two adjacent electric paths positioned in parallel, the magnetic fluxes generated by the respective electric currents are oppositely arranged, and thus are counterbalanced, thereby reducing the ESL in proportion to the magnetic fluxes. Thus, for the improved internal electrodes of the invention as shown in FIGS. 4a and 4b, the first and second internal electrodes 41 and 42 are vertically disposed within the ceramic block 11 so as to allow the electric currents to flow in opposite directions therethrough, and each of the conductive patterns of the first and second internal electrodes are divided by the slot so as to further divide each of the current paths while allowing the electric currents to flow in opposite directions through the adjacent current paths, thereby further reducing the parasitic impedance in comparison to the conventional capacitor.

The number of slots respectively formed to the first and second conductive patterns 411 and 412; 421 and 422 may be one or more. With regard to this, FIG. 4a shows an example of the conductive patterns, each having one slot, and FIG. 4b shows an example of the conductive patterns, each having two slots. As described above, the slot formed in the first and second conductive patterns 411 and 412; 421 and 422 allows the current to flow in opposite directions in the adjacent conductive patterns, thereby reducing the ESL. Further, the slot extends the length of the current path flowing in the first and second conductive patterns 411 and 412; 421 and 422, thereby preventing the ESR from being lowered. Here, since the current path is influenced by the width and length of the slot, the ESR can be controlled by changing the width and length of the slot formed in the first and second conductive patterns 411 and 412; 421 and 422. In particular, in the case where the number of slots is two in each conductive pattern as shown in FIG. 4, the length of the current path can be increased, thereby satisfying the ESR requirements of the capacitor. As such, as control of the ESR becomes possible in such a manner as described above, it is also possible to provide a stable design for a power distribution network while accomplishing target impedance.

In the first embodiment of the invention as described above, in order to reduce the length of the current path, the length of the withdrawing patterns 413 and 414; 423 and 424, which connect the first and second conductive patterns 411 and 412; 421 and 422 to the positive and negative external electrodes 12 and 13, respectively, must be reduced as much as possible. This is due to the fact that, when the voltages are applied to the withdrawing patterns 413 and 414; 423 and 424, electric currents flow in the withdrawing patterns, causing the ESL to be generated from the withdrawing patterns 413 and 414; 423 and 424. Thus, the ESL caused by the withdrawing patterns 413, 414, 423 and 424 can be further lowered by reducing the length of the withdrawing patterns 413 and 414; 423 and 424.

In the first embodiment of the invention, the pair of conductive patterns may be varied in each arrangement.

Figure 5A:
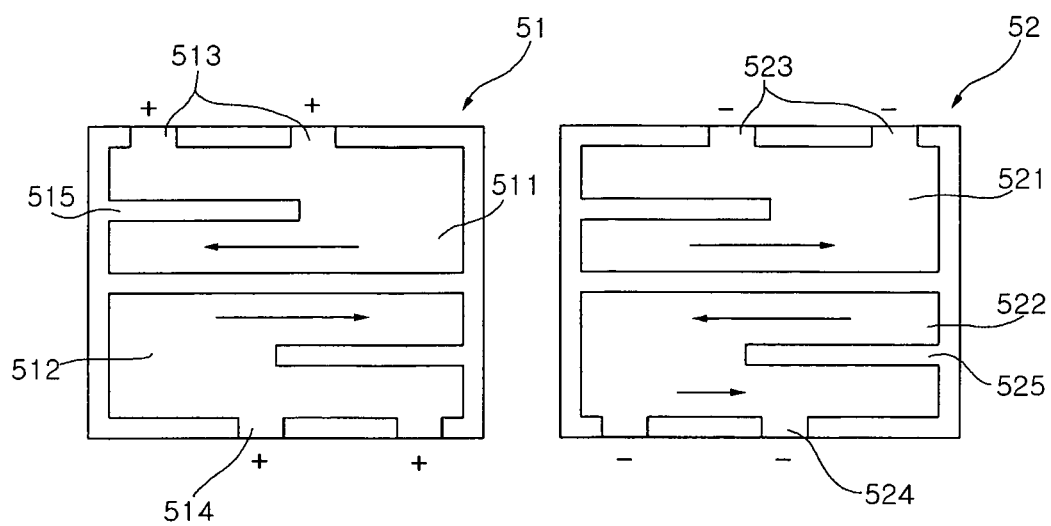
FIGS. 5a and 5b are diagrams illustrating internal electrodes of a laminated ceramic capacitor according to a second embodiment of the present invention.
Figure 5B:
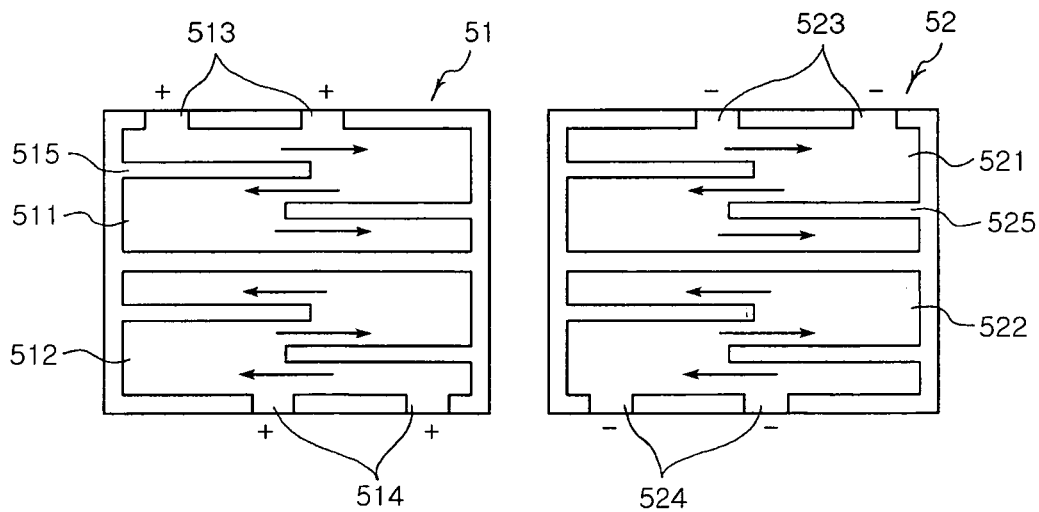

FIGS. 5a and 5b are diagrams illustrating internal electrodes according to a second embodiment of the invention, in which arrangement of a pair of conductive patterns is varied. Referring to FIGS. 5a and 5b, the laminated ceramic capacitor comprises first and second internal electrodes 51 and 52 vertically disposed adjacent to each other within the ceramic block 11, while allowing voltages having different polarities to be applied thereto, and a plurality of withdrawing patterns 513 and 514; 523 and 524, which connect the first and second internal electrodes 51 and 52 to the external electrodes 12 and 13, respectively. As with the first embodiment, each of the first and second internal electrodes 51 and 52 consists of first and second conductive patterns 511 and 521; 512 and 522 disposed in parallel, respectively. Each of the conductive patterns is formed with one or more slots.

At this time, the slots are formed to the first and second conductive patterns 511 and 521; 512 and 522, respectively so as to be formed in the opposite direction to that of the first embodiment. Additionally, the same external electrodes 12 and 13 having an identical polarity are connected to the pair of first and second conductive patterns 511 and 521; 512 and 522. As a result, a positive voltage is applied to the first and second conductive patterns 511 and 512 of the first internal electrode 51, while a negative voltage is applied to the second conductive patterns 521 and 522 of the second internal electrode 52.

Since the slots are oppositely provided to the first and second conductive patterns 511 and 521; 512 and 522, respectively, the electric currents flow in opposite directions through the adjacent regions thereof, thereby counterbalancing magnetic fluxes generated by the respective electric currents flowing through the first and second conductive patterns 511 and 521; 512 and 522. Additionally, current paths are vertically provided in symmetry through the first and second internal electrodes 51 and 52 while being disposed in opposite directions, thereby allowing the magnetic fluxes generated by the associated high frequency currents to be counterbalanced.

As with the first embodiment, the slots 515 and 525 allow current to flow in opposite directions in the adjacent conductive patterns, thereby counterbalancing the magnetic fluxes respectively generated by the conductive patterns, and reducing the ESL. Further, the slots 515 and 525 extend the length of the current path flowing in the respective conductive patterns, thereby preventing reduction of the ESR. Additionally, the ESR can be adjusted by controlling the width and the length of the slots 515 and 525.

Figure 6:
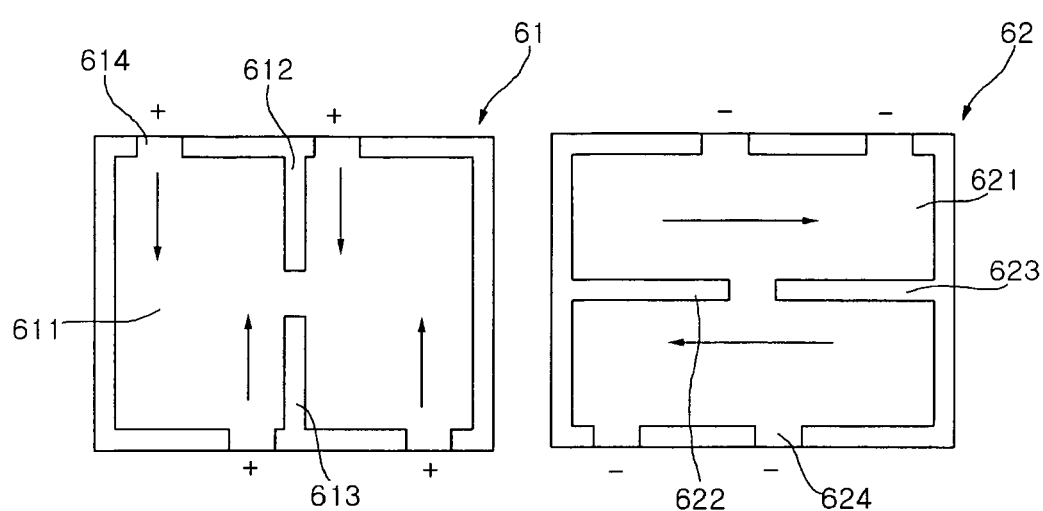
FIG. 6 is a diagram illustrating internal electrodes of a laminated ceramic capacitor according to a third embodiment of the present invention.

FIG. 6 is a diagram illustrating internal electrodes of a laminated ceramic capacitor according to a third embodiment of the invention. Referring to FIG. 6, the laminated ceramic capacitor of the invention has first and second internal electrodes 61 and 62 vertically disposed adjacent to each other within the ceramic block 11, and a plurality of withdrawing patterns 614 and 624, which connect the first and second internal electrodes 61 and 62 to the external electrodes 12 and 13 having different polarities. The first and second internal electrodes 61 and 62 comprise a rectangular-shaped conductive pattern 611 and 621, and two slots 612 and 613; 622 and 623 extended from two lateral sides of the rectangular conductive pattern facing each other toward the center of the conductive pattern, respectively, thereby dividing some portion of the conductive pattern 611 and 621 from some other portion thereof.

The slots 612 and 613; 622 and 623 are collinear, and bisect the conductive patterns 611 and 621 into two large regions, respectively.

At this time, the two slots 612 and 613 formed in the first internal electrode 61 are perpendicular to the two slots 622 and 623 formed in the second internal electrode 62, respectively. That is, if a positive voltage is applied to the first conductive pattern 611 of the first internal electrode 61 while a negative voltage is applied to the second conductive patterns 612 of the second internal electrode 62, the slots 612 and 613 of the first internal electrode 61 are formed from two lateral sides toward the center of the conductive pattern so as to be parallel to electric current flowing in the associated conductive pattern 611, and the slots 622 and 623 of the second internal electrode 62 are formed from other two lateral sides toward the center of the conductive pattern so as to be parallel to the electric current flowing in the associated conductive pattern 621.

With the construction as described above, the slots 612 and 613 of the first internal electrode 61 can guide the electric current to flow vertically in the conductive pattern 611, and the slots 622 and 623 of the second internal electrode 62 can guide the electric current to flow laterally in the conductive pattern 621. Additionally, the electric currents can flow in opposite directions in adjacent regions of the conductive patterns 611 and 621 around the slots 612 and 613; 622 and 623.

Accordingly, the laminated ceramic capacitor according to the third embodiment allows the electric currents to flow perpendicular to each other in the first and second internal electrodes 61 and 62 vertically adjacent to each other within the ceramic block 11, which prevents the mutual ESL from being generated, while reducing magnetic fluxes in each of the first and second internal electrodes 61 and 62, thereby further reducing the ESL.

Figure 7:
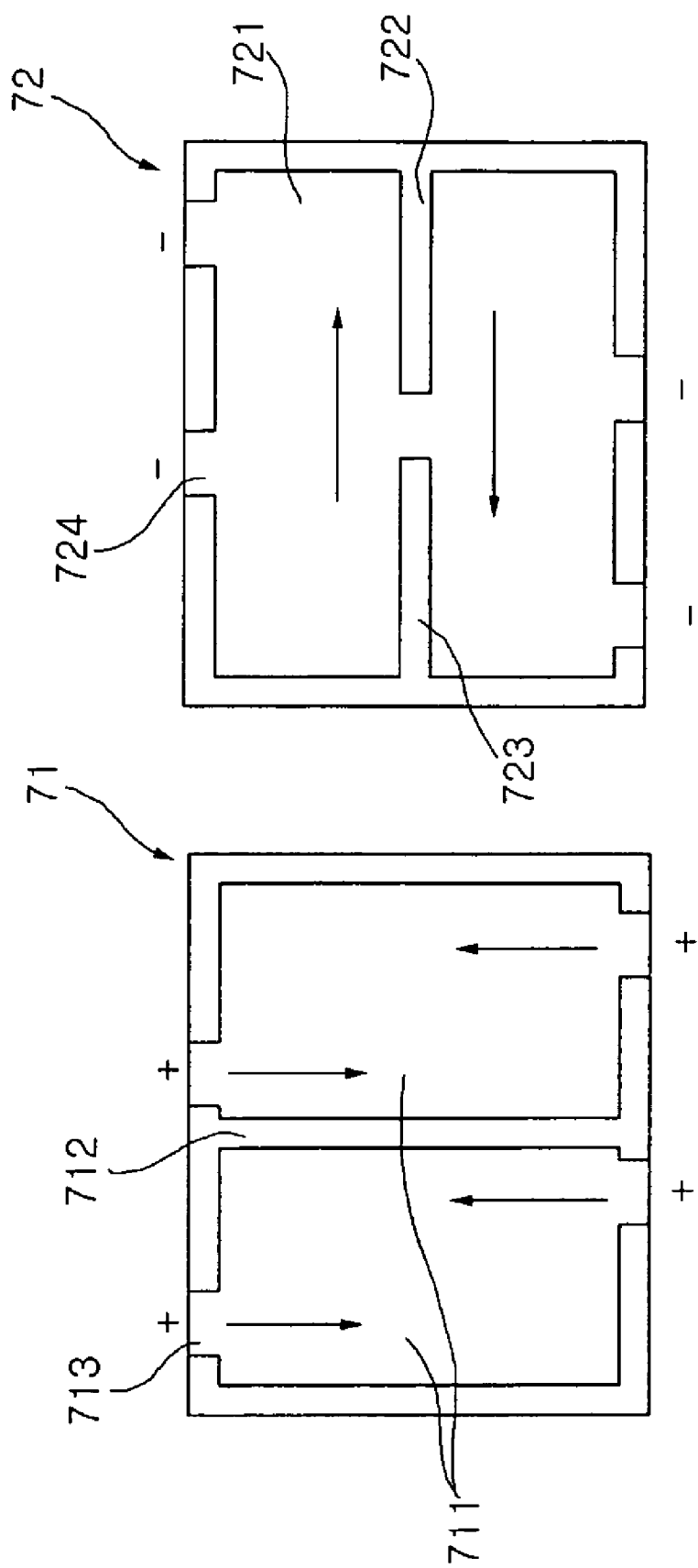
FIG. 7 is a diagram illustrating internal electrodes of a laminated ceramic capacitor according to a fourth embodiment of the present invention.
Figure 8:
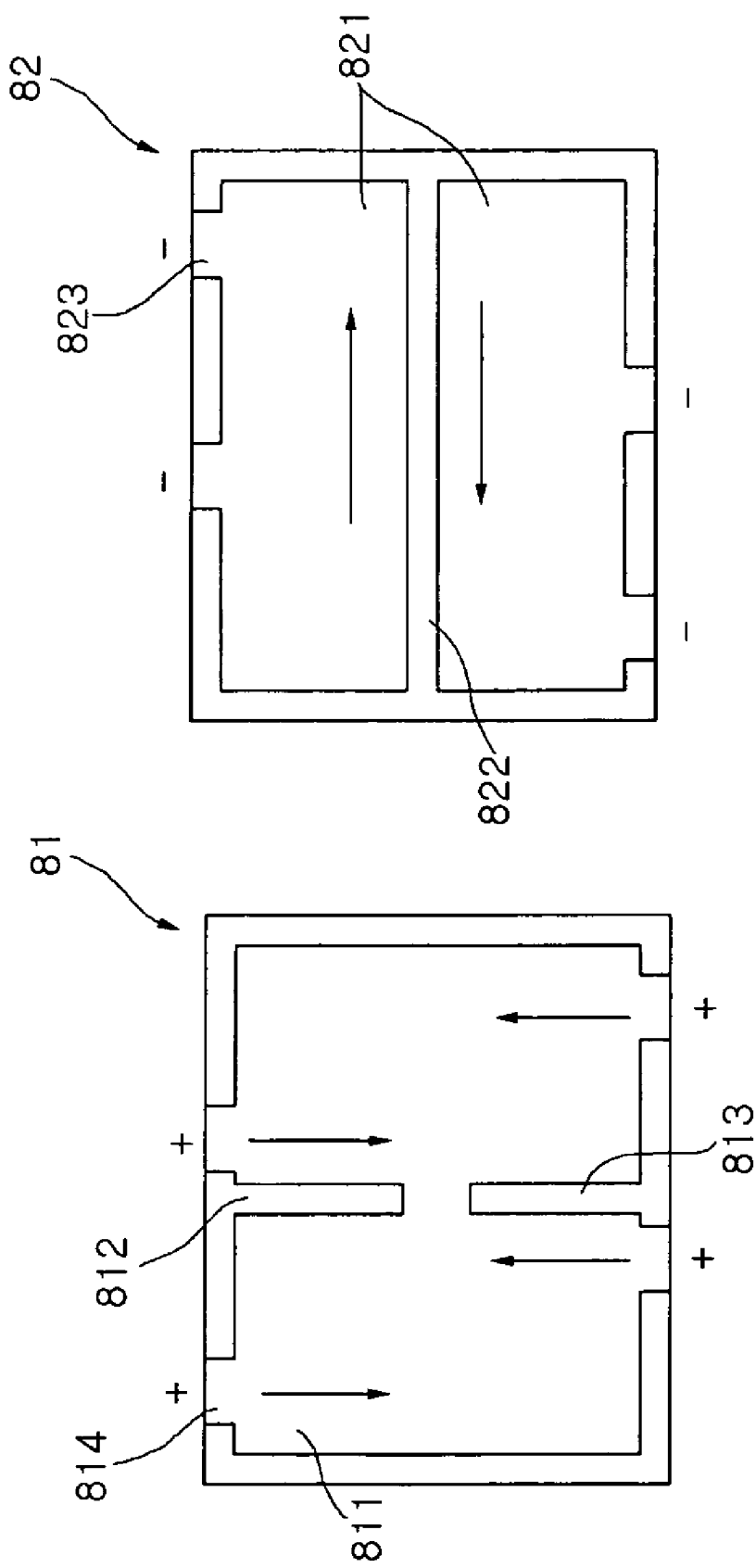
FIG. 8 is a diagram illustrating internal electrodes of a laminated ceramic capacitor according to a fifth embodiment of the present invention.

FIGS. 7 and 8 show internal electrodes of laminated ceramic capacitors according to fourth and fifth embodiments of the invention, as modifications of the construction described above.

The laminated ceramic capacitors according to the fourth and fifth embodiments shown in FIGS. 7 and 8 have the same constructions as those of the third embodiment shown in FIG. 6, except that two slots are connected to each other in a first internal electrode or in a second electrode so as to bisect a conductive pattern into two regions.

More specifically, as with the previously described embodiments, the laminated ceramic capacitor according to the fourth embodiment of the invention has first and second internal electrodes 71 and 72 vertically disposed adjacent to each other within the ceramic block 11, and a plurality of withdrawing patterns 713 and 724, which connect the first and second internal electrodes 71 and 72 to the external electrodes 12 and 13 having different polarities, respectively. The first internal electrodes 71 comprise a rectangular conductive pattern 711, and a slot 712 extended between two lateral sides of the conductive pattern 711 facing each other so as to bisect the rectangular conductive pattern 711. The second internal electrode 72 comprises a rectangular conductive pattern 721, and two slots 723 and 722 extended from the two other lateral sides of the conductive pattern facing each other toward the center of the conductive pattern, respectively, to be perpendicular to the slot 712 of the first internal electrode 71.

Referring to FIG. 8, the laminated ceramic capacitor according to the fifth embodiment of the invention has first and second internal electrodes 81 and 82 vertically disposed adjacent to each other within the ceramic block 11, and a plurality of withdrawing patterns 814 and 823, which connect the first and second internal electrodes 81 and 82 to the external electrodes 12 and 13 having different polarities, respectively. The first internal electrode 81 comprises a rectangular conductive pattern 811, and two slots 812 and 813 extended from two lateral sides of the conductive pattern 811 facing each other toward the center of the conductive pattern, respectively, and the second internal electrode 82 comprises a rectangular conductive pattern 821, and a slot 822 perpendicular to the slots 812 and 813 while being extended between the two other lateral sides of the pattern 821 facing each other so as to bisect the rectangular conductive pattern 821.

Electrical operations in the internal electrodes shown in FIGS. 7 and 8 are the same as those of the internal electrodes of the third embodiment shown in FIG. 6.

Figure 9:
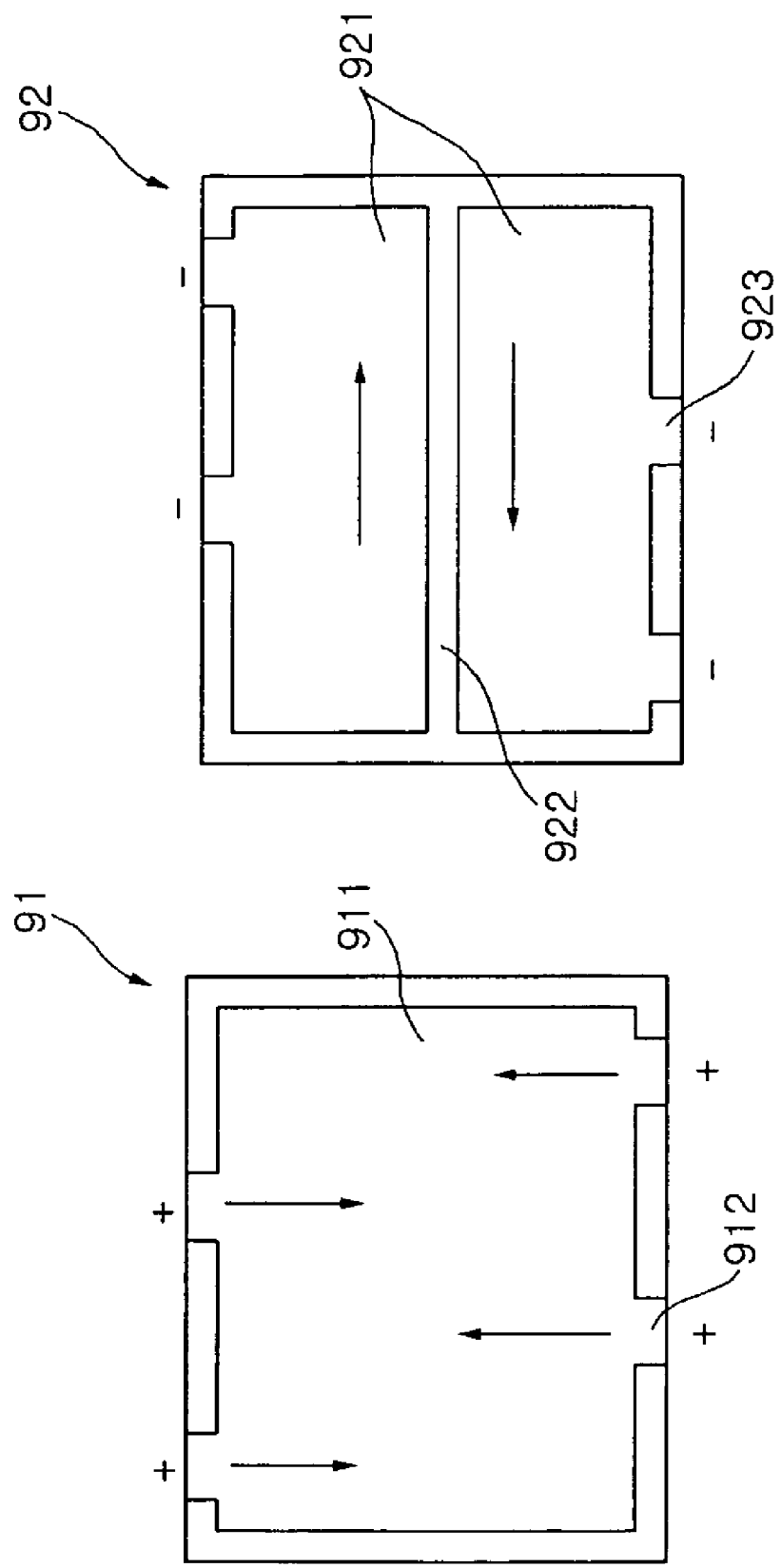
FIG. 9 is a diagram illustrating internal electrodes of a laminated ceramic capacitor according to a sixth embodiment of the present invention.

As another modification of the invention, FIG. 9 shows internal electrodes of a laminated ceramic capacitor according to a sixth embodiment of the invention.

Referring to FIG. 9, the laminated ceramic capacitor according to the sixth embodiment of the invention has first and second internal electrodes 91 and 92 vertically disposed adjacent to each other within the ceramic block 11, and a plurality of withdrawing patterns 912 and 923, which connect the first and second internal electrodes 91 and 92 to the external electrodes 12 and 13 having different polarities, respectively. The first internal electrode 91 consists of a rectangular conductive pattern 911, and the second internal electrode 92 consists of a rectangular conductive pattern 921, and a slot 992 extended between two lateral sides of the conductive pattern 921 facing each other so as to bisect the conductive pattern 921.

The second internal electrode 92 shown in FIG. 9 has the same shape and electrical operation as those of the second internal electrode 82 shown in FIG. 8. However, there is a difference in that the first internal electrode 91 shown in FIG. 9 consists of the rectangular conductive pattern 911 without the slot formed therein.

The slots formed in the first and second internal electrodes as shown in FIGS. 6 to 9 are provided to subdivide the directions of the electric currents flowing in the conductive patterns, and formed in parallel to the electric currents flowing in the internal electrodes.

Figure 10:
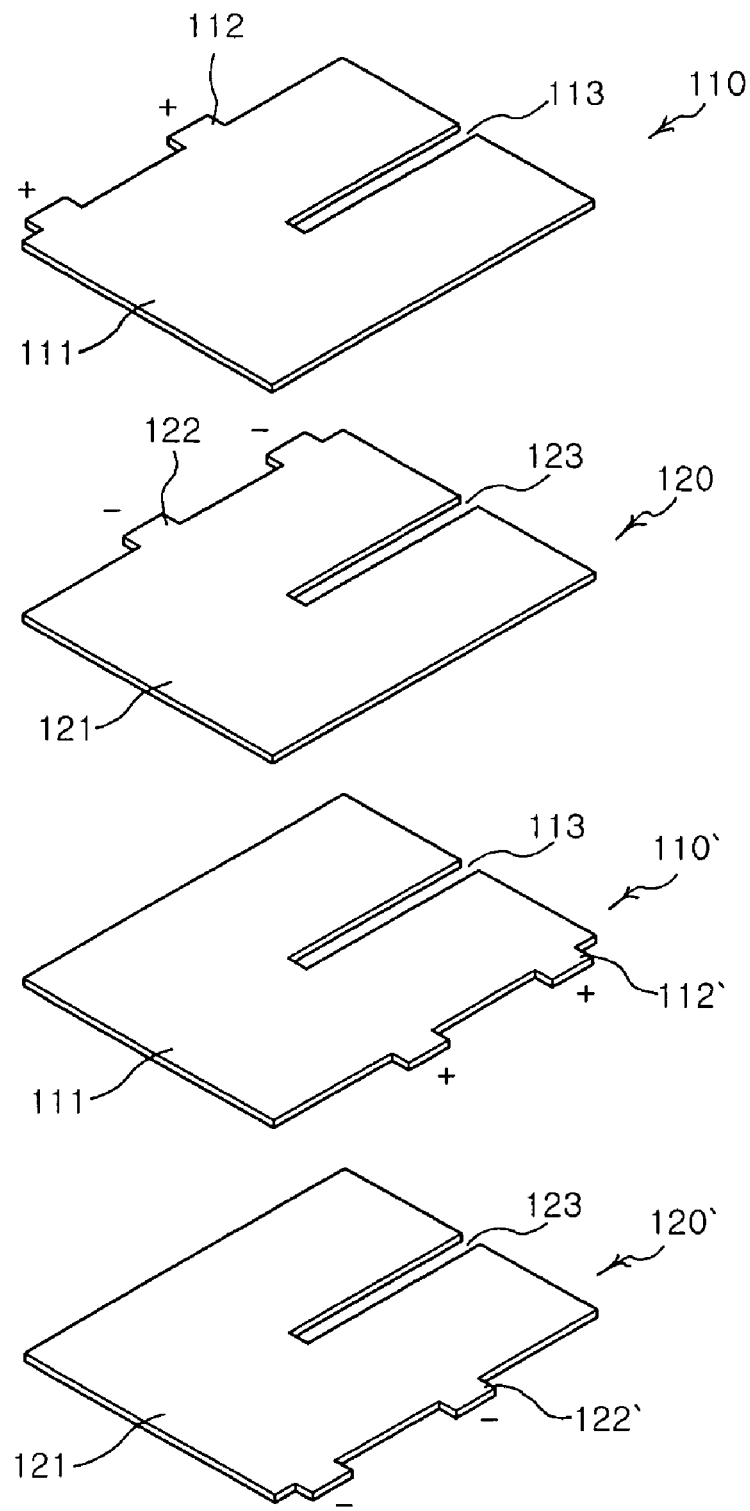
FIG. 10 is a diagram illustrating internal electrodes of a laminated ceramic capacitor according to a seventh embodiment of the present invention.

Referring to FIG. 10, internal electrodes of a laminated ceramic capacitor according to a seventh embodiment of the invention are illustrated, which enables ESR to be reduced and ESR to be controlled by changing a current path and the length thereof by use of slots 113 and 123 without forming a plurality of conductive patterns in each of first and second internal electrodes 110,110' and 120,120'. According to the seventh embodiment, the laminated ceramic capacitor comprises first and second internal electrodes 110,110' and 120,120' alternately arranged within the ceramic block 11, and a plurality of withdrawing patterns 112,112' and 122, 122', which connect the first and second internal electrodes 110,110' and 120,120' to the external electrodes 12 and 13 having different polarities, respectively. The first and second internal electrodes 110,110' and 120,120' consist of rectangular conductive patterns 111 and 121, and slots 113 and 123 formed in the conductive patterns 111 and 121 to change a current path, respectively. With such a construction, electric currents flow in opposite directions with reference to the slot in each conductive pattern 111 or 121, thereby reducing the ESR through counterbalance of the magnetic fluxes. Additionally, the length of the current path is increased by controlling the width and length of the slots 113 and 123, thereby preventing the ESR from being lowered too much while enabling the control of the ESR. Furthermore, as shown in FIGS. 4b and 5b, the plural slots 113 and 123 may be provided in each conductive pattern. Furthermore, the number of the withdrawing patterns 110,110',120,120' may be one or more each the first and second internal electrodes 110,110',120,120'. As the above embodiments describe two withdrawing patterns formed in the first and second internal electrodes, in this case, the first and second electrodes can be classified into two type.

The laminated ceramic capacitor of the invention may have various constructions of the external electrodes, such as an eight-terminal type, a nine-terminal type, a ten-terminal type, and a twelve-terminal type.

FIGS. 11a to 14e show arrangements of the withdrawing patterns according to arrangements of the external electrodes in the laminated ceramic capacitor according to the various embodiments of the invention.

FIGS. 11a to 11e show the withdrawing patterns according to arrangements of the external electrodes in the laminated ceramic capacitor according to the first embodiment shown in FIG. 4a. More specifically, FIG. 11a shows the construction of the withdrawing patterns in the case of the eight-terminal type, FIGS. 11b and 11c show the withdrawing patterns in the case of the ten-terminal type, and FIGS. 11d and 11e show the withdrawing patterns in the case of the twelve-terminal type, in which the withdrawing patterns are changed in arrangement according to arrangements of the external electrodes. In FIGS. 11a to 11e, the positions of the withdrawing patterns 413 and 414; 423 and 424 are determined such that voltages having opposite polarities can be applied to the first and second internal electrodes 41 and 42, while being applied to the first and second conductive patterns 411 and 412; 421 and 422 in the first and second internal electrodes 41 and 42, respectively.

FIGS. 12a to 12g show the withdrawing patterns according to arrangements of the external electrodes in the laminated ceramic capacitor according to the second embodiment shown in FIG. 5a. More specifically, FIG. 12a shows the withdrawing patterns in the case of the eight-terminal type, FIGS. 12b to 12e show the withdrawing patterns in the case of the ten-terminal type, and FIGS. 12f and 12g show the constructions of the withdrawing patterns in the case of the twelve-terminal type, in which the withdrawing patterns are changed according to arrangements of the external electrodes. In FIGS. 12a to 12g, the number and the positions of the withdrawing patterns 513 and 514; 523 and 524 are determined such that the first and second internal electrodes 51 and 52 can have opposite polarities, while the pair of conductive patterns 511 and 512; 521 and 522 can have the same polarity.

In FIGS. 12c and 12e, the two withdrawing patterns formed in the pair of conductive patterns 511 and 512; 521 and 522 towards the side surface are simultaneously connected to one external electrode positioned on the side surface of the ceramic block 11.

Figures 13A, 13B, 13C, 13D, 13E:
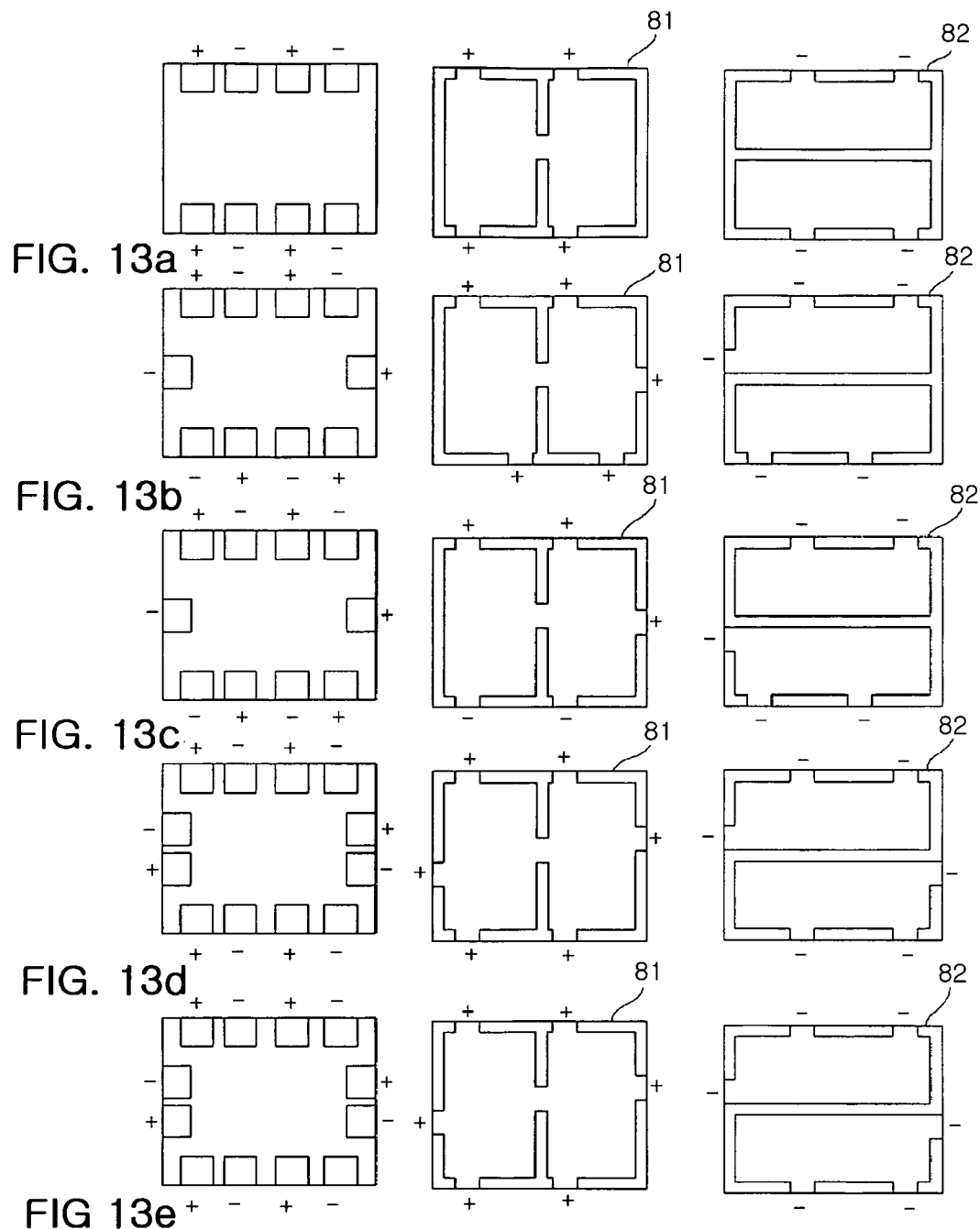
FIGS. 13a to 13e are diagrams illustrating withdrawing patterns according to arrangements of the external electrodes in the laminated ceramic capacitor according to the fifth embodiment of the present invention.

FIGS. 13a to 13e show the withdrawing patterns depending on the arrangement of the external electrodes in the laminated ceramic capacitor according to the fifth embodiment shown in FIG. 8. More specifically, FIG. 13a shows the withdrawing patterns in the case of the eight-terminal type, FIGS. 13b and 13c show the withdrawing patterns in the case of the ten-terminal type, and FIGS. 13d and 13e show the withdrawing patterns in the case of the twelve-terminal type, in which the withdrawing patterns are changed according to arrangements of the external electrodes. In FIGS. 13a to 13e, the withdrawing patterns 814 and 823 are arranged such the first and second internal electrodes 81 and 82 vertically disposed within the ceramic block may have different polarities.

Figure 14A:
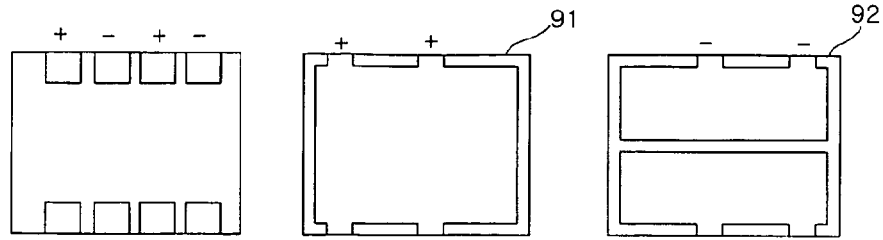
FIGS. 14a to 14e are diagrams illustrating withdrawing patterns according to arrangements of the external electrodes in the laminated ceramic capacitor according to the sixth embodiment of the present invention.
Figure 14B:
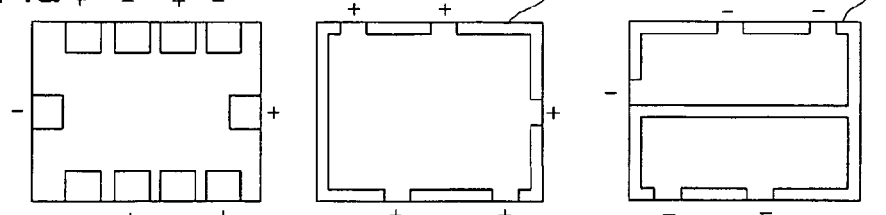
Figure 14C:
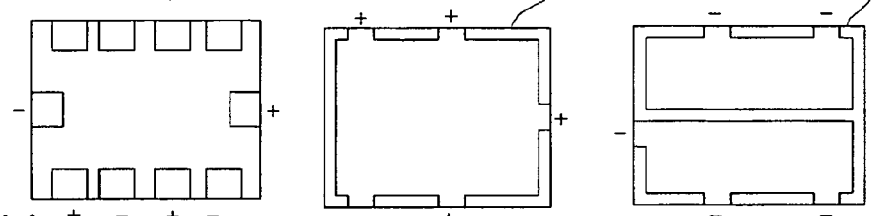
Figure 14D:
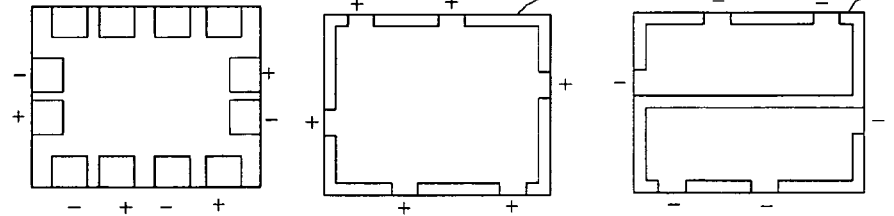
Figure 14E:
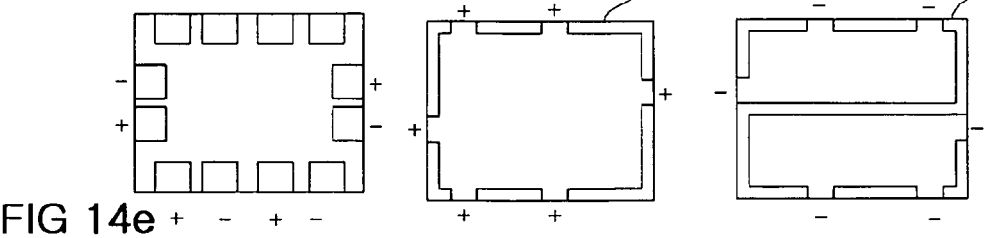

FIGS. 14a to 14e show the withdrawing patterns depending on the arrangement of the external electrodes in the laminated ceramic capacitor according to the sixth embodiment shown in FIG. 9. More specifically, FIG. 14a shows the withdrawing patterns in the case of the eight-terminal type, FIGS. 14b and 14c show the withdrawing patterns in the case of the ten-terminal type, and FIGS. 14d and 14e show the withdrawing patterns in the case of the twelve-terminal type, in which the withdrawing patterns are changed according to arrangements of the external electrodes. In FIGS. 14a to 14e, the withdrawing patterns 912 and 923 are disposed such the first and second internal electrodes 91 and 92 vertically disposed within the ceramic block can have different polarities.

Although the above embodiments describe several withdrawing patterns formed in the first and second internal electrodes, the number of the withdrawing patterns may be reduced to one or two. Even in this case, the ESR is prevented from being lowered too much, unlike the conventional technology.

Figure 15:
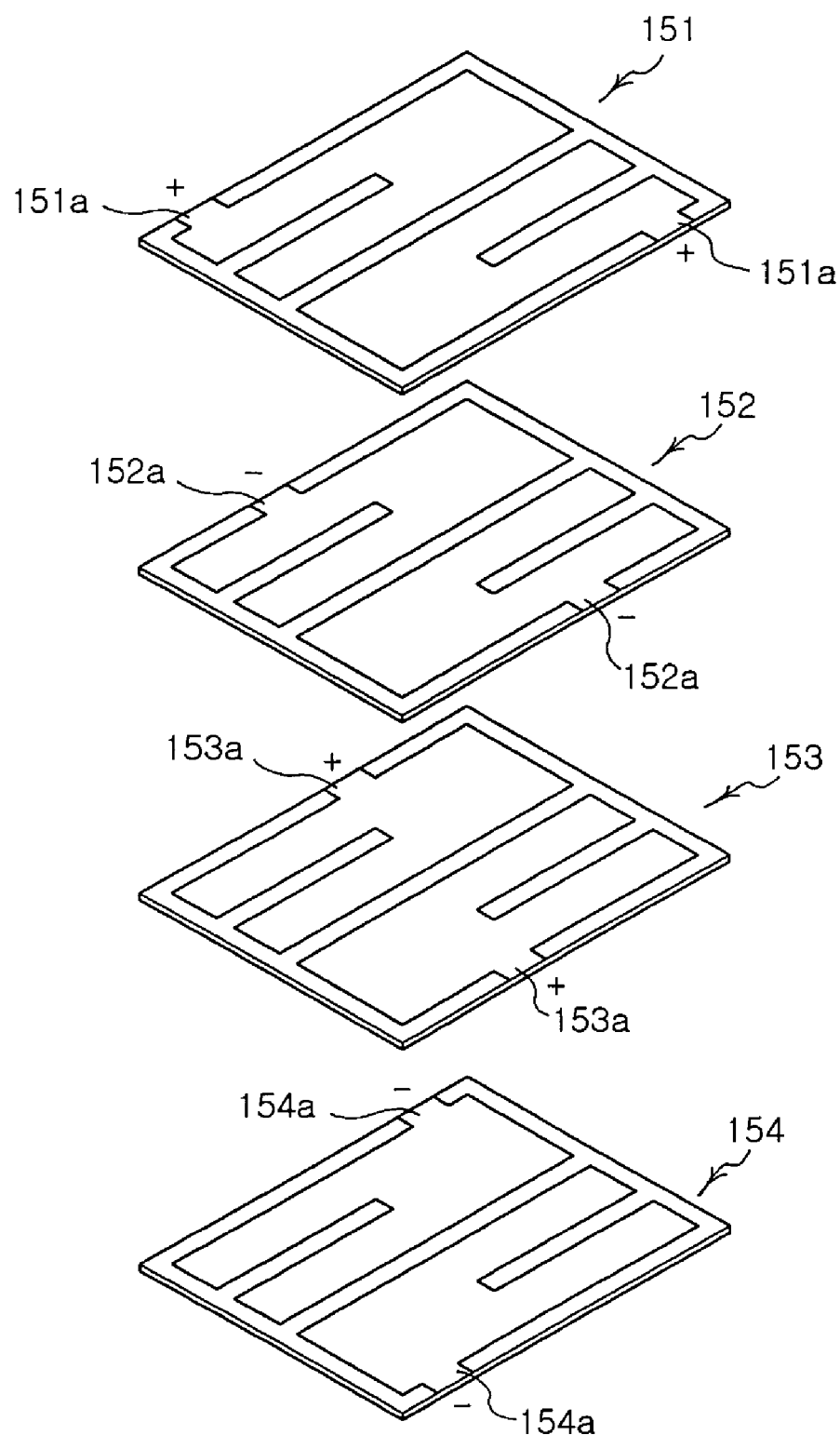
FIG. 15 shows another example of withdrawing patterns of the laminated ceramic capacitor according to the present invention.

FIG. 15 shows a modification of the withdrawing patterns of the laminated ceramic capacitor according to the second embodiment shown in FIG. 5a.

Referring to FIG. 15, reference numerals 151 and 153 indicate first internal electrodes to which a positive voltage is applied, and reference numerals 152 and 154 indicate second electrodes to which a negative voltage is applied. At this time, the plurality of internal electrodes 151, 153, 153 and 154 are provided with withdrawing patterns 151a to 154a and 151b to 154b, respectively, such that each conductive pattern in each internal electrode 151, 153, 153 or 154 has one withdrawing pattern, and such that the withdrawing patterns 151a to 154a and 151b to 154b are located at different positions.

In particular, assuming that among the plurality of external electrodes 12 and 13 shown in FIG. 1, the external electrodes formed and spaced a predetermined distance from each other on one side surface of the ceramic block 11 are referred to as first to fourth external electrodes in a predetermined direction, and the other external electrodes formed on the opposite side surface of the ceramic block 11 are referred to as fifth to eighth external electrodes in the same direction as that of the first to fourth external electrodes, the withdrawing patterns 151a to 154a respectively formed to the conductive patterns at one side are connected to the first to fourth external electrodes from above to below according to the lamination order, while the other withdrawing patterns 151b to 154b respectively formed to the other conductive patterns at the other side are connected to the fifth to eighth external electrodes from above to below according to the laminated order.

That is, the eight-terminal type laminated ceramic capacitor is divided into two types according to the position of the respective withdrawing patterns 151a, 153a, 153a and 154a formed in the first and second internal electrodes 151, 152, 153 and 154 to which the positive and the negative voltages are applied, respectively, and is repetitiously formed with the four internal electrodes 151, 152, 153 and 154 shown in FIG. 15. The withdrawing patterns 151a, 153a, 153a and 154a are formed as described above, so that the number of the withdrawing patterns connected to the outer electrode in each internal electrode can be reduced, thereby reducing the ESL caused by the withdrawing pattern while preventing the ESR from being lowered too much.

The modification of the withdrawing patterns may be directly applied to the laminated ceramic capacitors according to the other embodiments as described above.

As apparent from the above description, the laminated ceramic capacitor of the invention minimizes the ESL while preventing the ESR from being lowered too much. Additionally, the laminated ceramic capacitor of the invention can control the ESR through adjustment of the length/width of the slot, thereby providing an excellent effect of satisfying the characteristics of the decoupling capacitor in the high frequency circuit.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A laminated ceramic capacitor, comprising:
a ceramic block comprising a lamination of a plurality of ceramic sheets;
a plurality of external electrodes formed on outer surfaces of the ceramic block to face each other and define at least a positive terminal and at least a negative terminal;
first and second internal electrodes alternately arranged within the ceramic block and electrically connected to the external electrodes, respectively;
wherein electric currents flow in the first and second internal electrodes in directions perpendicular to each other.

2. The ceramic capacitor as set forth in claim 1, wherein each of the first internal electrodes comprises a first rectangular conductive pattern, and two first slots extending from two opposite lateral sides of the first rectangular conductive pattern toward the center of the first rectangular conductive pattern; and
each of the second internal electrodes comprises a second rectangular conductive pattern, and two second slots perpendicular to the first slots and extending from two opposite lateral sides of second the rectangular conductive pattern toward the center of the second rectangular conductive pattern.

3. The ceramic capacitor as set forth in claim 1, wherein each of the first internal electrodes comprises a first rectangular conductive pattern, and a first slot extending between two opposite lateral sides of the first rectangular conductive pattern so as to bisect the rectangular conductive pattern; and
each of the second internal electrodes comprises a second rectangular conductive pattern, and two second slots perpendicular to the first slot and extending from two opposite lateral sides of the second rectangular conductive pattern toward the center of the second rectangular conductive pattern.

4. The ceramic capacitor as set forth in claim 1, wherein each of the first internal electrodes comprises a first rectangular conductive pattern; and
each of the second internal electrodes comprises a second rectangular conductive pattern, and a slot extended between two opposite lateral sides of the second rectangular conductive pattern so as to bisect the second rectangular conductive pattern.

5. A laminated ceramic capacitor, comprising:
a ceramic block comprising a lamination of a plurality of ceramic sheets;
a plurality of external electrodes formed on outer surfaces of the ceramic block to face each other and define at least as a positive terminal and at least a negative terminal;
first and second internal electrodes alternately arranged within the ceramic block; and
a plurality of connecting patterns connecting the first and second internal electrodes to the external electrodes, respectively;
wherein
electric currents flow in the first and second internal electrodes in opposite directions;
each of the first and second internal electrodes comprises a pair of adjacent rectangular conductive patterns, and at least one slot extending from a lateral side toward the center of each said conductive pattern to change a direction of the electric current within said conductive pattern; and
the slots are located at the same positions in the pair of conductive patterns, respectively.

6. A laminated ceramic capacitor, comprising:
a ceramic block comprising a lamination of a plurality of ceramic sheets;
a plurality of external electrodes formed on outer surfaces of the ceramic block to face each other and define at least as a positive terminal and at least a negative terminal;
first and second internal electrodes alternately arranged within the ceramic block; and
a plurality of connecting patterns connecting the first and second internal electrodes to the external electrodes, respectively;
wherein
electric currents flow in the first and second internal electrodes in opposite directions;
each of the first and second internal electrodes comprises a pair of adjacent rectangular conductive patterns, and at least one slot extending from a lateral side toward the center of each said conductive pattern to change a direction of the electric current within said conductive pattern; and
the pair of conductive patterns allows the electrical currents to flow in opposite directions through adjacent regions of the conductive patterns.

7. A laminated ceramic capacitor, comprising
a ceramic block comprising a lamination of a plurality of ceramic sheets;
a plurality of external electrodes formed on outer surfaces of the ceramic block to face each other and define at least as a positive terminal and at least a negative terminal;
first and second internal electrodes alternately arranged within the ceramic block; and
a plurality of connecting patterns connecting the first and second internal electrodes to the external electrodes, respectively;
wherein
electric currents flow in the first and second internal electrodes in opposite directions;
each of the first and second internal electrodes comprises a pair of adjacent rectangular conductive patterns, and at least one slot extending from a lateral side toward the center of each said conductive pattern to change a direction of the electric current within said conductive pattern; and each said connecting pattern is formed in each said conductive pattern of each said internal electrode such that the connecting patterns are located at different positions in the conductive patterns perpendicularly adjacent to each other, respectively.

8. The ceramic capacitor as set forth in claim 5, wherein the conductive patterns of each said pair are connected to the external electrodes having an identical polarity.

9. The ceramic capacitor as set forth in claim 7, wherein said external electrodes comprise first to fourth external electrodes spaced a from each other and located on one outer side surface of the ceramic block and fifth to eighth external electrodes spaced from each other and located on the opposite outer side surface of the ceramic block, wherein said first to fourth external electrodes and said fifth to eighth external electrodes are arranged in the recited orders alone the same directions;

the conductive patterns comprise first to fourth conductive patterns located adjacent said one outer side surface of the ceramic block, said first conductive pattern being on top of said second conductive pattern which is in turn, is on top of said third conductive pattern which is, in turn, on top of said fourth conductive pattern; and fifth to eighth conductive patterns located adjacent said opposite outer side surface of the ceramic block, said fifth conductive pattern being on top of said sixth conductive pattern which is, in turn, is on top of said seventh conductive pattern which is, in turn, on top of said eighth conductive pattern; and the connecting patterns comprise a first set of connecting patterns respectively connecting the first to fourth conductive patterns to the first to fourth external electrodes; and a second set of connecting patterns respectively connecting the fifth to eighth conductive patterns to the fifth to eighth external electrodes.

10. A laminated ceramic capacitor, comprising;

a ceramic block comprising a lamination of a plurality of ceramic sheets;

a plurality of external electrodes formed on outer surfaces of the ceramic block to face each other and define at least as a positive terminal and at least a negative terminal;

first and second internal electrodes alternately arranged within the ceramic block; and a plurality of connecting patterns connecting the first and second internal electrodes to the external electrodes, respectively;

wherein electric currents flow in the first and second internal electrodes in opposite directions;

each of the first and second internal electrodes comprises a pair of adjacent rectangular conductive patterns and at least one slot extending from a lateral side toward the center of each said conductive pattern to change a direction of the electric current within said conductive pattern;

the slots are located at opposite positions in the pair of conductive patterns; and conductive patterns of each said pair are connected to the external electrodes having opposite polarities.

11. A laminated ceramic capacitor, comprising;

a ceramic block comprising a lamination of a plurality of ceramic sheets;

a plurality of external electrodes formed on outer surfaces of the ceramic block to face each other and define at least as a positive terminal and at least a negative terminal;

first and second internal electrodes alternately arranged within the ceramic block; and a plurality of connecting patterns connecting the first and second internal electrodes to the external electrodes, respectively;

wherein electric currents flow in the first and second internal electrodes in opposite directions;

each of the first and second internal electrodes comprises a pair of adjacent rectangular conductive patterns, and two slots extending from two opposite lateral sides of each said conductive pattern toward the center of said conductive pattern to change a direction of the electric current within said conductive pattern; and the slots are located at opposite positions in the pair of conductive patterns.

12. A laminated ceramic capacitor, comprising:

a ceramic block comprising a lamination of a plurality of ceramic sheets;

a plurality of external electrodes defining at least a positive terminal and at least a negative terminal, and including first to fourth external electrodes spaced from each other and arranged in the recited order on one outer side surface of the ceramic block in a predetermined direction, and fifth to eighth external electrodes spaced from each other and located opposite to the first to fourth external electrodes and on the opposite outer side surface of the ceramic block;

first and second internal electrodes alternately arranged within the ceramic block; wherein each of the first and second internal electrodes comprises a pair of adjacent rectangular conductive patterns, and at least one slot extending from a lateral side toward the center of each said conductive pattern to change a direction of an electric current within the conductive pattern; and a plurality of connecting patterns connecting the first and second internal electrodes to the external electrodes, respectively;

wherein the conductive patterns comprise first to fourth conductive patterns located adjacent said one outer side surface of the ceramic block, said first conductive pattern being on top of said second conductive pattern which is in turn, is on top of said third conductive pattern which is, in turn, on top of said fourth conductive pattern; and fifth to eighth conductive patterns located adjacent said opposite outer side surface of the ceramic block, said fifth conductive pattern being on top of said sixth conductive pattern which is, in turn, is on top of said seventh conductive pattern which is, in turn, on top of said eighth conductive pattern; and wherein the connecting patterns comprise a first set of connecting patterns respectively connecting the first to fourth conductive patterns to the first to fourth external electrodes; and a second set of connecting patterns respectively connecting the fifth to eighth conductive patterns to the fifth to eighth external electrodes.

* * * * *